No. 818,060. PATENTED APR. 17, 1906.
R. THEW & H. H. HARRIS.
PNEUMATIC WHEEL.
APPLICATION FILED DEC. 19, 1904.
2 SHEETS—SHEET 1.
Fig. 1.
Fig. 2.
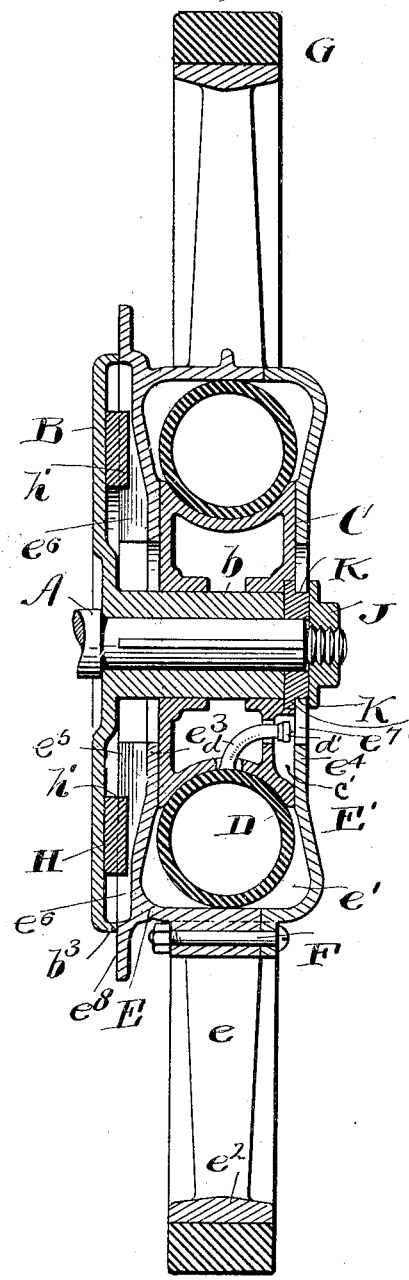
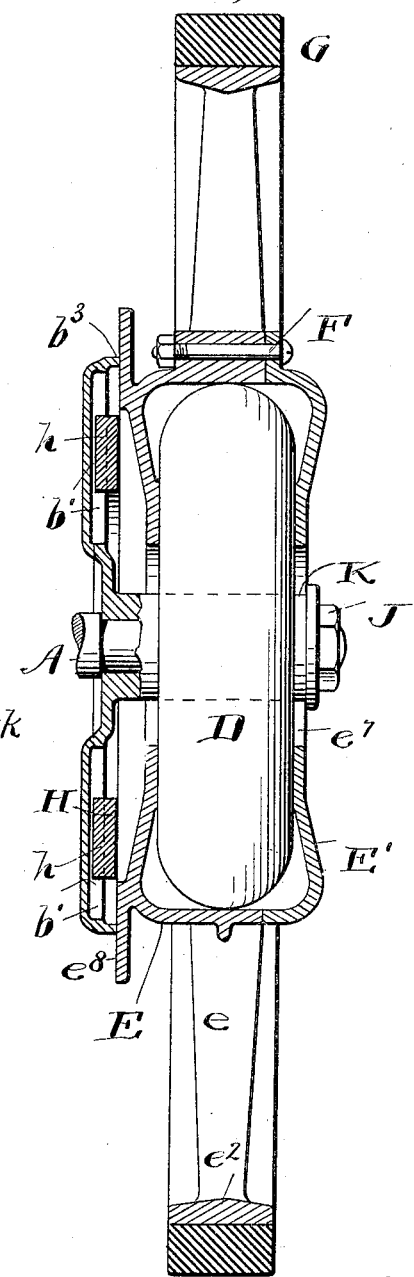
Witnesses.
E. B. Gilchrist
B. W. Brockett
Inventors.
Richard Thew,
Hollis H. Harris,
By Their Attorneys,
Thurston & Bates.

No. 818,060. PATENTED APR. 17, 1906.
R. THEW & H. H. HARRIS.
PNEUMATIC WHEEL.
APPLICATION FILED DEC. 19, 1904.
2 SHEETS—SHEET 2.
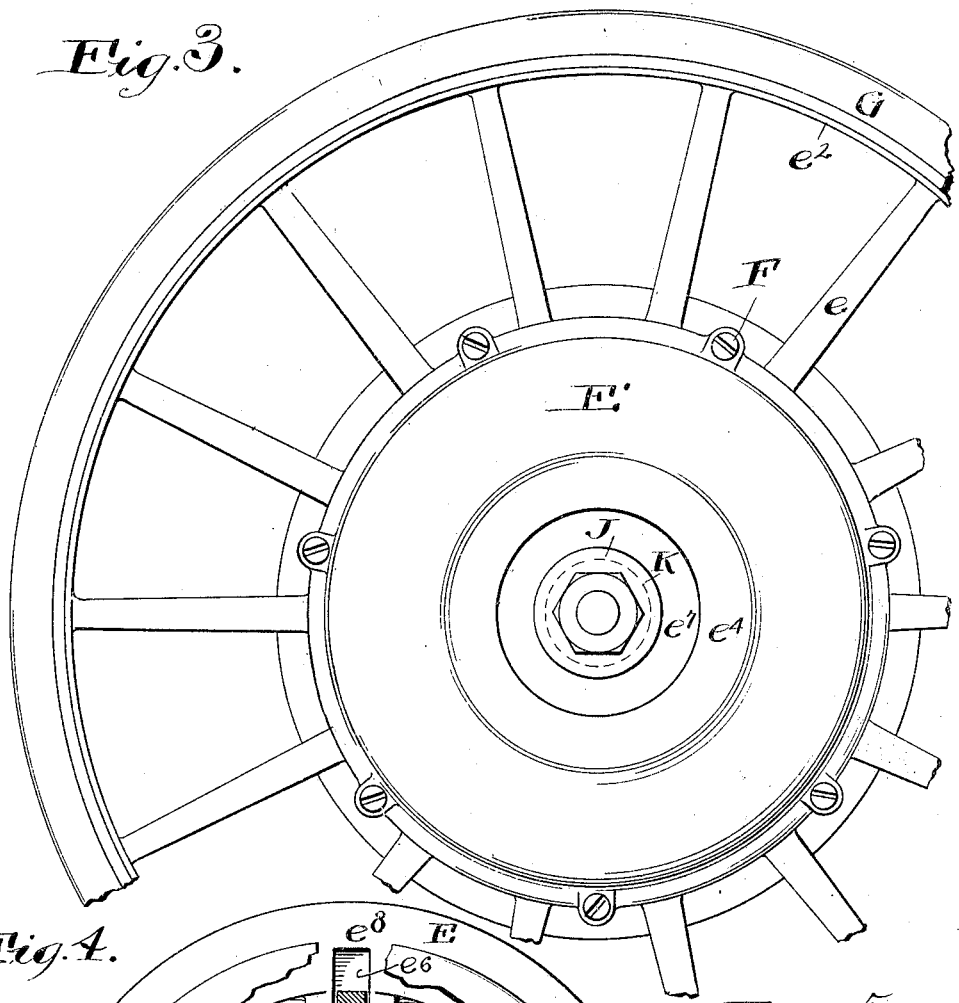
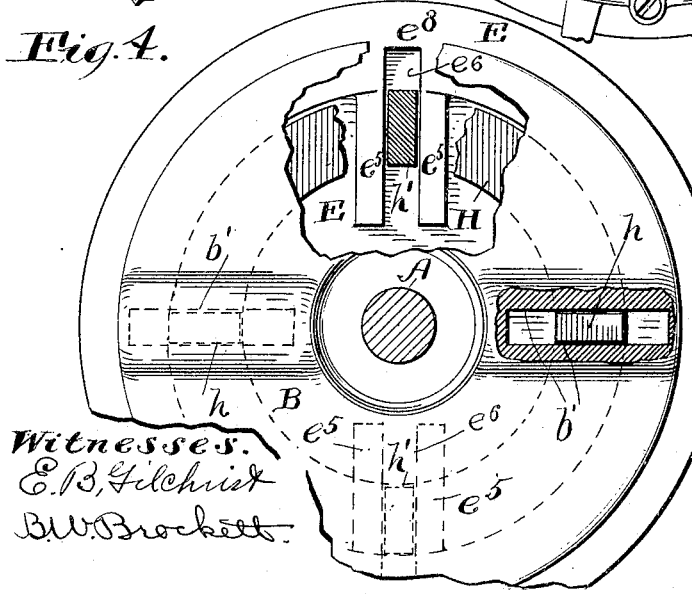
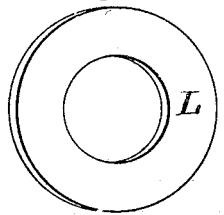
Witnesses.
E. B. Gilchrist
B. W. Brockett
Inventors.
Richard Thew,
Hollis H. Harris,
By their Attorneys,
Thurston & Bates

UNITED STATES PATENT OFFICE.

RICHARD THEW AND HOLLIS H. HARRIS, OF LORAIN, OHIO.

PNEUMATIC WHEEL.

No. 818,060.

Specification of Letters Patent.

Patented April 17, 1906.

Application filed December 19, 1904. Serial No. 237,391.

*To all whom it may concern:*

Be it known that we, RICHARD THEW and HOLLIS H. HARRIS, citizens of the United States, residing at Lorain, in the county of Lorain and State of Ohio, have invented a certain new and useful Improvement in Pneumatic Wheels, of which the following is a full, clear, and exact description, reference being had to the accompanying drawings.

The object of this invention is to provide a pneumatic wheel wherein the cushioning hose-pipe is relieved of wearing attrition and driving strain by being placed within the wheel, a solid tire being provided on the tread.

We have so devised the wheel that it is neat in appearance, may be easily taken apart for repair, and may be used as a solid wheel in case of emergency, should the pneumatic hose break.

The invention includes the combination with a wheel, of a pneumatic hose-pipe placed around the axis of rotation and supporting the weight, and means engaging the wheel outside of the pneumatic pipe to drive the wheel. In such a wheel the driving is not accomplished through the medium of the rubber pipe, which is thus relieved of a great deal of strain.

The invention is more fully hereinafter described, and its essential characteristics set out in the claims.

In the drawings, Figure 1 is a diametric section through the wheel and driving-axle. Fig. 2 is a diametric section at right angles to Fig. 1, but showing the pneumatic pipe in edge elevation. Fig. 3 is an outside elevation of the wheel. Fig. 4 is a vertical section across the axle on the inner side of the wheel, showing the driving mechanism. Fig. 5 is a perspective view of the emergency distance-piece.

The same letters of reference designate the same part in each figure.

In the drawings, A represents the axle of an automobile or other vehicle. Mounted on this axle is a disk B, having a hub $b$ surrounding the axle. When the wheel is a driving-wheel, the axle is keyed to this hub $b$ and drives the wheel by means of the disk B, as hereinafter explained.

Loosely journaled on the hub $b$ is an annular member C. This member is shown as hollow for lightness of construction. Its sides are parallel and at right angles to the axis, and its periphery is concaved. Seated in this concave periphery is a continuous annular pneumatic hose-pipe D. Surrounding the hose-pipe and bearing upon its periphery is a casing E, from which extend the spokes $e$ of the wheel. A cover-plate E' is secured to the casing by bolts F, extending through ears on the casing and cover-plate, as shown. At the outer end of the spokes $e$ is a rim $e^2$, surrounding which is a solid tire G.

The casing E and cover-plate E' constitute an enlarged hub for the wheel. Within this hub is a flaring space $e'$, allowing the hose-pipe to spread laterally as it is flattened under weight. The casing E has an inwardly-extending flat portion $e^3$, which lies snugly against the side of the member C, and the cover-plate E' has a similar flat portion $e^4$ lying against the outer side of this member. Each of these flat portions bounds circular central openings of considerably greater diameter than the hub $b$. The casing and cover-plate while they make snug connections with the member C are free to slide vertically thereon. Wherefore, as the weight of the vehicle forces down the axle and the member C the pneumatic pipe D flattens on its under portion, and the wheel moves relatively to the axle. The pneumatic pipe thus makes as good a cushion between the road and the axle of the vehicle as if it were on the tire of the wheel, while it is relieved from the wear of contact with the road. Moreover, the driving rotation of the wheel is not communicated from the axle through the pneumatic pipe, but independently thereof, relieving the pipe of continuous driving strain, which is one of the greatest factors in the wearing out of a pneumatic tire.

The driving of the wheel is accomplished by the disk B and the casing E through the intermediacy of a ring H between the disk and the casing, and having lugs $h$ engaging the disk and other lugs $h'$ engaging the casing. The lugs $h$ are placed diametrically opposite on the face of the ring H toward the vehicle and take into radially-placed slots $b'$ in the disk. The lugs $h'$ on the other face of the ring are diametrically placed and at right angles to the lugs $h$ and slide in slots $e^6$, provided by a pair of parallel guides $e^5$ on the casing E.

By means of the slots $b'$ and $e^6$ at right angles to each other the ring H is allowed to automatically adjust itself to the varying up and down movements of the axle during the driving. Thus when the lug $h'$ is directly above the axle, as shown in Figs. 1 and 4, depression of the axle results in these lugs sliding downward within the slots $e^6$. On the other hand, when the lugs $h$ are directly above or below the axle, as shown in Fig. 2, a downward movement of the axle causes these lugs to slide within their slots $b'$. At intermediate points the sliding takes place, partly in the slots $b'$ and partly in the slots $e^6$. To keep the mechanism closed during this sliding, we provide on the casing E a flange $e^8$, having a flat outer face adapted to engage an inwardly-projecting flange $b^3$ on the periphery of the disk B. This plate and flange are always in engagement, as the disk and casing slide relatively to each other.

The wheel is held on the axle by a nut J, screwed onto the end of the axle and bearing against a collar K, which bears against the end of the hub $b$ of the disk B. The collar and hub are clamped by the nut against a shoulder on the axle. The member C fits loosely enough on the hub $b$ so that it may revolve independently thereof, though it is held in place by an overhanging flange $k$ of the collar K.

It will be seen from the above description that the pneumatic pipe is relieved of any driving strain, nor does it rub over either the casing or the annular member C. It retains its position on the member C, which adjusts itself about the hub $b$ accordingly.

The removal of the nut J allows the wheel to be removed from the axle, and the removal of the bolts F allows the plate E' to be taken off and the annular member C and the pneumatic pipe to be removed. This allows for the easy repair of the pipe.

In case the pipe breaks, the wheel may be used as a solid wheel by simply removing the nut J and placing a flat ring L, Fig. 5, about the collar K, the ring being of such size as to fill the circular opening $e^7$ of the cover-plate E'. A flange on the nut holds this emergency-ring in place. This emergency provision of our wheel is of great importance, for even if the hose-pipe should break the automobilist is nevertheless able to get home with no greater inconvenience than the jolting due to a solid wheel.

The tire is inflated through a suitable tube $d$, which passes into the annular member C, as shown, and has a capped end $d'$ occupying a recess $c'$ in the outer side of the member C. If desired, the tire may be cemented to this member.

We claim—

1. The combination of a sleeve adapted to surround the axle, an annular member mounted on said sleeve, a cushion on said annular member, a wheel having a hollow casing surrounding said cushion, a collar on the axle bearing against said sleeve and holding said annular member in place, and means for holding the collar in place.

2. The combination of an annular member adapted to surround an axle, an elastic annular cushion surrounding said member, a wheel having a hollow casing seated on said cushion and a piece adapted to be placed around the axle and engage the casing to convert the wheel into a solid wheel.

3. The combination of an axle, an annular member adapted to surround the same, a cushion on the annular member, a wheel having a hollow casing surrounding said cushion, and having a flange lying alongside of said annular member, and a distance-piece adapted to surround the axle and engage the flange of said casing.

4. The combination of an axle, an annular member surrounding the same, a cushion on the annular member, a wheel having a hollow casing surrounding the cushion, said wheel having a flange lying alongside of the annular member, there being a central opening through said flange, a nut screwing onto the end of the axle, and a ring adapted to surround the axle and lie alongside of said annular member and prevent movement of said hub toward or from the axle, said nut being adapted to hold said ring in place.

5. In combination, in a wheel, an annular member adapted to rotate freely about an axle, said member having a cushion-seat on its periphery, a cushion on said seat, a casing open at its center and embracing said annular member closely so as to be guided in its movement thereby, said casing connected to a rim and flared to permit the lateral expansion of the cushion.

6. In combination, in a wheel, a hub adapted to fit over an axle and having integral therewith a driving-disk, an annular member mounted on and freely rotatable about said hub, said annular member having a cushion mounted on its periphery, a casing open at its center and embracing said annular member, retaining and positioning means adapted to fit over the end of the axle and bear against the annular member, a rim carried by the casing and a shifting drive connection between the driving-disk and the casing.

In testimony whereof we hereunto affix our signatures in the presence of two witnesses.

RICHARD THEW.
HOLLIS H. HARRIS.

Witnesses:
ALBERT H. BATES,
B. W. BROCKETT.